US009369186B1

(12) United States Patent
Rexroad et al.

(10) Patent No.: US 9,369,186 B1
(45) Date of Patent: Jun. 14, 2016

(54) UTILIZING MOBILE DEVICES IN PHYSICAL PROXIMITY TO CREATE AN AD-HOC MICROPHONE ARRAY

(71) Applicants: Michael Gregory Rexroad, Sunnyvale, CA (US); Neil Joshi, Milpitas, CA (US)

(72) Inventors: Michael Gregory Rexroad, Sunnyvale, CA (US); Neil Joshi, Milpitas, CA (US)

(73) Assignee: Cisco Technology, Inc., San Jose, CA (US)

( * ) Notice: Subject to any disclaimer, the term of this patent is extended or adjusted under 35 U.S.C. 154(b) by 26 days.

(21) Appl. No.: 14/560,299

(22) Filed: Dec. 4, 2014

(51) Int. Cl.
*H04M 3/42* (2006.01)
*H04B 5/06* (2006.01)
*H04L 29/06* (2006.01)
*H04W 84/18* (2009.01)

(52) U.S. Cl.
CPC .............. *H04B 5/06* (2013.01); *H04L 65/403* (2013.01); *H04W 84/18* (2013.01)

(58) Field of Classification Search
USPC ........................................................ 455/416
See application file for complete search history.

(56) References Cited

U.S. PATENT DOCUMENTS

| 8,223,187 | B2 | 7/2012 | Joshi et al. |
| 2010/0188473 | A1 | 7/2010 | King et al. |
| 2012/0330653 | A1 | 12/2012 | Lissek et al. |
| 2013/0022216 | A1 | 1/2013 | Ganong et al. |
| 2013/0106977 | A1 | 5/2013 | Chu et al. |

*Primary Examiner* — Joel Ajayi
(74) *Attorney, Agent, or Firm* — P. Su

(57) ABSTRACT

According to one aspect, a method includes determining when a first device and a second device are in proximity to each other, wherein the first device includes a first microphone and the second device includes a second microphone. The method also includes pairing the first device and the second device, and creating a mobile mapping of the physical relationship between the first device and the second device. Pairing the first device and the second device forms a microphone array that includes the first microphone and the second microphone. An aggregate stream is created using a first stream obtained from the first microphone and a second stream obtained from the second microphone. Creating the aggregate stream includes using the model mapping to determine when to use the first stream and when to use the second stream. Finally, the method also includes transmitting the aggregate stream.

14 Claims, 9 Drawing Sheets

UTILIZING MOBILE DEVICES IN PHYSICAL PROXIMITY TO CREATE AN AD-HOC MICROPHONE ARRAY

TECHNICAL FIELD

The disclosure relates generally to measuring capturing audio signals during a meeting. More particularly, the disclosure related to creating and utilizing microphones of mobile devices to create an ad-hoc microphone array for use during a meeting.

BACKGROUND

Many meetings involve audio and/or video components that are broadcast to remote participants. For example, many meetings may be audio and/or video conferences which include participants located at a physical location such as a conference room, and participants at a remote location to whom audio streams from the physical location may be broadcast or otherwise transmitted. At many meetings, there is at least one fixed microphone at a physical location, e.g., a microphone on a speaker phone, into which participants may speak. The quality of audio transmitted to remote participants in a meeting may be poor, particularly when a speaker is not positioned substantially directly in from of a microphone.

The quality of audio that is transmitted from meeting participants in a physical location such as a conference room to meeting participants participating virtually or remotely may generally be affected by many factors. Background noises such as microphone scuffing, breathing, background conversation, and room echo may adversely affect the quality of audio transmitted to remote participants in a meeting. Audio transmitted to remote participants in a meeting may be unintelligible, for example, when two participants in a conference room speak at substantially the same time. In addition, the volume or loudness of audio may be affected by the position of an active speaker and/or orientation relative to a microphone and, thus, the quality of audio transmitted to remote participants may be compromised.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

General Overview

Figure 1:
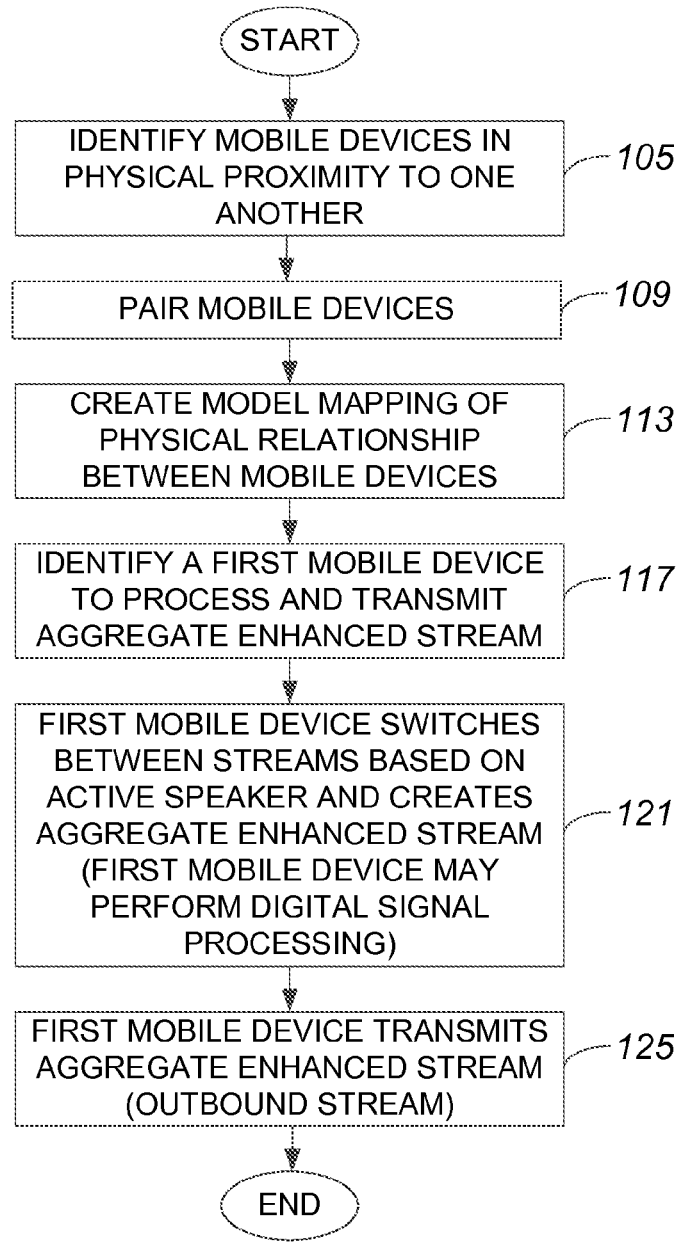
FIG. 1 is a process flow diagram which illustrates a method of creating and utilizing an ad-hoc microphone array that includes microphones of a plurality of mobile devices in accordance with an embodiment.

In one embodiment, a method includes determining when a first device and a second device are in proximity to each other, wherein the first device includes a first microphone and the second device includes a second microphone. The method also includes pairing the first device and the second device, and creating a mobile mapping of the physical relationship between the first device and the second device. Pairing the first device and the second device forms a microphone array that includes the first microphone and the second microphone. An aggregate stream is created using a first stream obtained from the first microphone and a second stream obtained from the second microphone. Creating the aggregate stream includes using the model mapping to determine when to use the first stream and when to use the second stream. Finally, the method also includes transmitting the aggregate stream.

DESCRIPTION

A meeting such as an audio conference, a video conference, or a multimedia conference generally involves providing or otherwise transmitting audio to remote participants. As a microphone used to capture audio during a meeting is typically at a fixed position in a physical location, unless an active speaker is positioned substantially directly in front of the microphone, the quality of the audio that is captured and transmitted may be compromised.

Parties who attend a meeting in person, e.g., parties who attend a multimedia conference at a physical location such as a conference room, are often in possession of mobile devices, particularly mobile devices that include microphones. For example, a party who is physically present in a meeting room for a meeting may have his or her mobile phone, tablet, and/or laptop computer in his or her possession. As there may generally be multiple mobile devices and, hence, multiple associated microphones, in a meeting room during a meeting, the ability to create an ad-hoc microphone array from the microphones such that the ad-hoc microphone array may be used to capture audio during the meeting may improve the quality of audio transmitted to remote participants in the meeting.

By identifying mobile devices in physical proximity to one another at a physical location, the microphones of the mobile devices may be identified for inclusion, e.g., pairing, in an ad-hoc microphone array. Mapping the precise location of each of the mobile devices and, hence, microphones included in the ad-hoc microphone array, as well as the orientation of each of the mobile devices allows a selection to be made as to which microphone provides the most desirable audio stream based on a current speaker. The ability to relatively precisely identify locations and orientations of microphones included in an ad-hoc microphone array at a physical location associated with a meeting may enhance digital signal processing of audio streams obtained from the microphones and, hence, improve the quality of audio provided to remote participants in the meeting.

An ad-hoc microphone array may generally be an array of microphones effectively created from microphones included in various devices such as mobile devices. For example, an ad-hoc microphone array may include microphones of different cellular phones that are all located at a particular location.

Mobile devices may generally include, but are not limited to including, cellular or mobile phones, laptops, tables, and headsets. In one embodiment, a mobile device may be substantially any portable device that includes a microphone and may be used to participate in a meeting, e.g., a telepresence meeting or a conference call.

Referring initially to FIG. 1, a method of creating and utilizing an ad-hoc microphone array that includes microphones of a plurality of mobile devices will be described in accordance with an embodiment. A method 101 of creating and utilizing an ad-hoc microphone array begins at step 105 in which mobile devices that are in physical proximity to one another are identified or detected. The mobile devices may be identified or detected when a meeting, as for example a meeting in which remote participants may participate, is initiated or is underway. In one embodiment, mobile devices at a particular physical location, e.g., in a conference room, may be identified as being in physical proximity to one another.

Any suitable method may generally be used to identify mobile devices that are in physical proximity to one another, as for example at a geographical location associated with a meeting. Suitable methods may include, but are not limited to including, utilizing Bluetooth 4.0 LE to determine physical proximity between devices, utilizing iBeacon to determine the presence of devices, and the like. Further, threshold distances used to assess whether devices are in physical proximity to one another may vary.

After identifying mobile devices that are in physical proximity to one another, the mobile devices are paired in step 109. Pairing the mobile devices effectively creates an ad-hoc microphone array from the microphones of the mobile devices. In one embodiment, mobile devices that are in physical proximity to one another may be automatically paired. Methods or techniques used to pair mobile devices may include, but are not limited to including, Bluetooth techniques, WiFi techniques, and/or ultrasonic techniques. Other methods used to pair mobile devices may include methods which utilize meeting invitations to pair or otherwise associate mobile devices.

Once mobile devices are paired, a model mapping of a physical relationship between the paired mobile devices is created in step 113. Relatively precise physical positions of the paired mobile devices and/or the orientations of the paired mobile devices may be used to create a mapping of the paired mobile devices. For example, when iBeacons or substantially equivalent transmitters are in the vicinity of the paired mobile devices, the paired mobile devices may determine their physical positions relative to the iBeacons or transmitters.

From step 113, process flow moves to step 117 in which a first mobile device, e.g., one of the paired mobile devices, is identified for use to process streams, e.g., audio streams, obtained from the mobile devices and to transmit aggregate streams such as aggregate enhanced streams created from the streams. The first mobile device that is identified may create an aggregate enhanced stream from the streams obtained from the mobile devices. The first mobile device is also typically arranged to transmit or otherwise provide the aggregate enhance stream to remote participants in a meeting, or virtual participants in a meeting. For example, the first mobile device may effectively function as a master device such as a WiFi-direct group owner that handles the aggregation of and the processing of audio streams. It should be understood that while a single mobile device may be identified for use in processing streams and creating an aggregate enhanced stream, more than one mobile device may be used in processing streams and creating an aggregate enhanced stream.

The first mobile device switches between streams, e.g., inbound streams, based on the location of an active speaker, and creates an aggregate stream using the streams in step 121. Typically, the first mobile device may switch to a stream that is provided by a microphone closest to the active speaker such that the stream is chosen in part using the model mapping. For example, to create an aggregate stream, the first mobile device may obtain a stream from substantially the best microphone signal available for a current speaker.

The first mobile device may also perform digital signal processing on the streams to create an aggregate enhanced stream. Audio streams from microphones of an ad-hoc microphone array that are not capturing audio from an active speaker may be used in digital signal processing to substantially filter out background sounds or other disturbances from an aggregate stream to create an aggregate enhanced stream. By way of example, proximity and location of microphones capturing audio that is not associated with an active speaker may be used in digital signal processing to facilitate the identification of sounds that a relevant to the active speaker. Digital signal processing may further be enhanced when microphones in an ad-hoc microphone array use beam forming to determine a precise source location for various sounds and, thus, may enable filtering and/or muting of sounds or disturbances that are not associated with the active speaker. In general, digital signal processing may allow background noise to be removed from an outbound stream and loudness to be substantially normalized in the outbound stream. As will be understood by those skilled in the art, digital signal processing may also allow metadata to be provided with an outbound stream such that a recipient of the outbound stream may enhance audio source separation.

In step 125, the first mobile device transmits the aggregate enhanced stream, or the outbound stream. That is, the first mobile device transmits an outbound stream to remote, or virtual, participants in the meeting. Upon the first mobile device transmitting the aggregate enhanced stream, the method of creating and utilizing an ad-hoc microphone array is completed.

Figure 2:
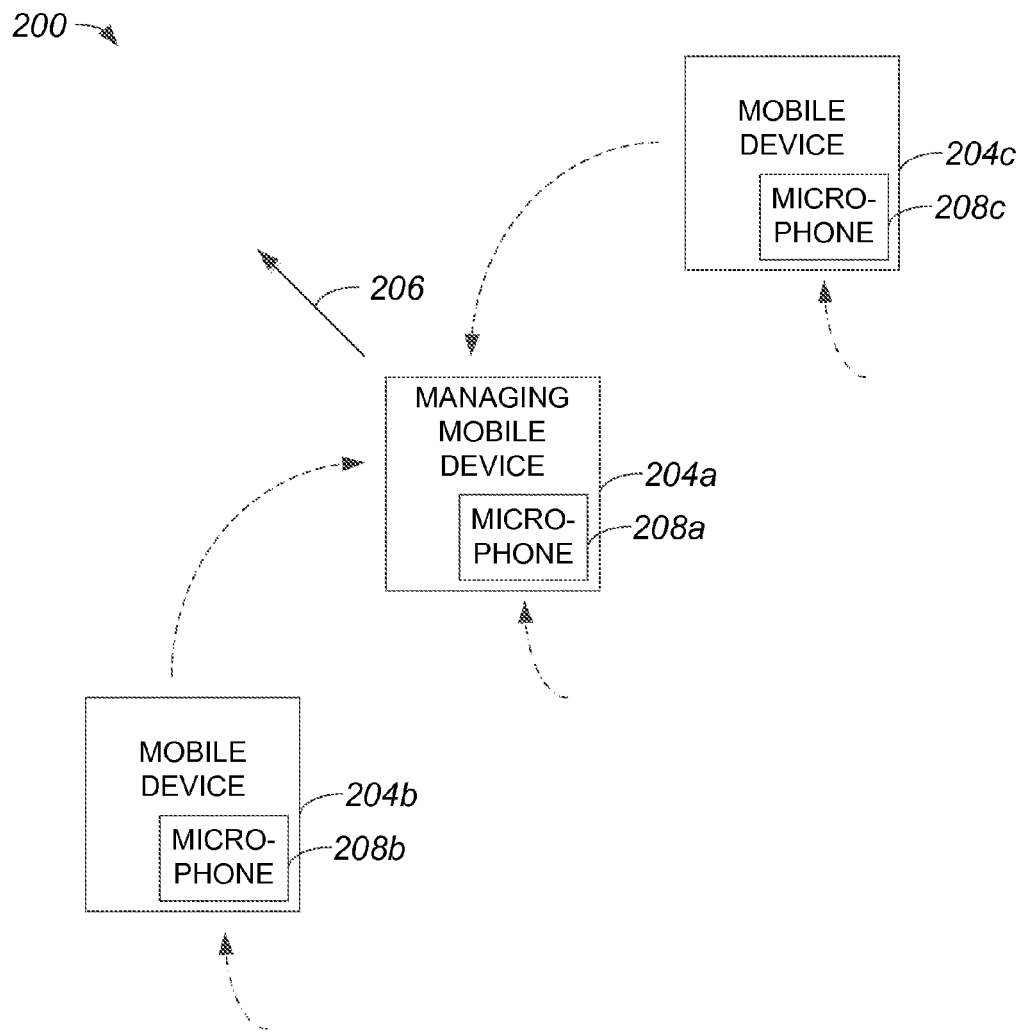
FIG. 2 is a diagrammatic representation of an ad-hoc microphone array that includes a plurality of mobile devices in accordance with an embodiment.

FIG. 2 is a diagrammatic representation of an ad-hoc microphone array that includes a plurality of mobile devices in accordance with an embodiment. An ad-hoc microphone array 200 may include multiple mobile devices 204*a-c*. Each mobile device 204*a-c* includes a microphone 208*a-c* or, more generally, a sensor arrangement that is configured to capture sound. Ad-hoc microphone array 200 may be created or otherwise formed when parties in possession of mobile devices 204*a-c* are at substantially the same physical location and are participating in a meeting, e.g., a telepresence meeting.

Mobile device 204*a* may be a managing mobile device arranged to effectively obtain sound captured by microphones 208*a-c* and to create an outbound stream 206, or an aggregate enhanced stream, for transmission to remote or virtual participants in the meeting. In one embodiment, mobile device 204*a* may also perform digital signal processing on the sound captured by microphones 208*a-c* to create outbound stream 206.

Figure 3:
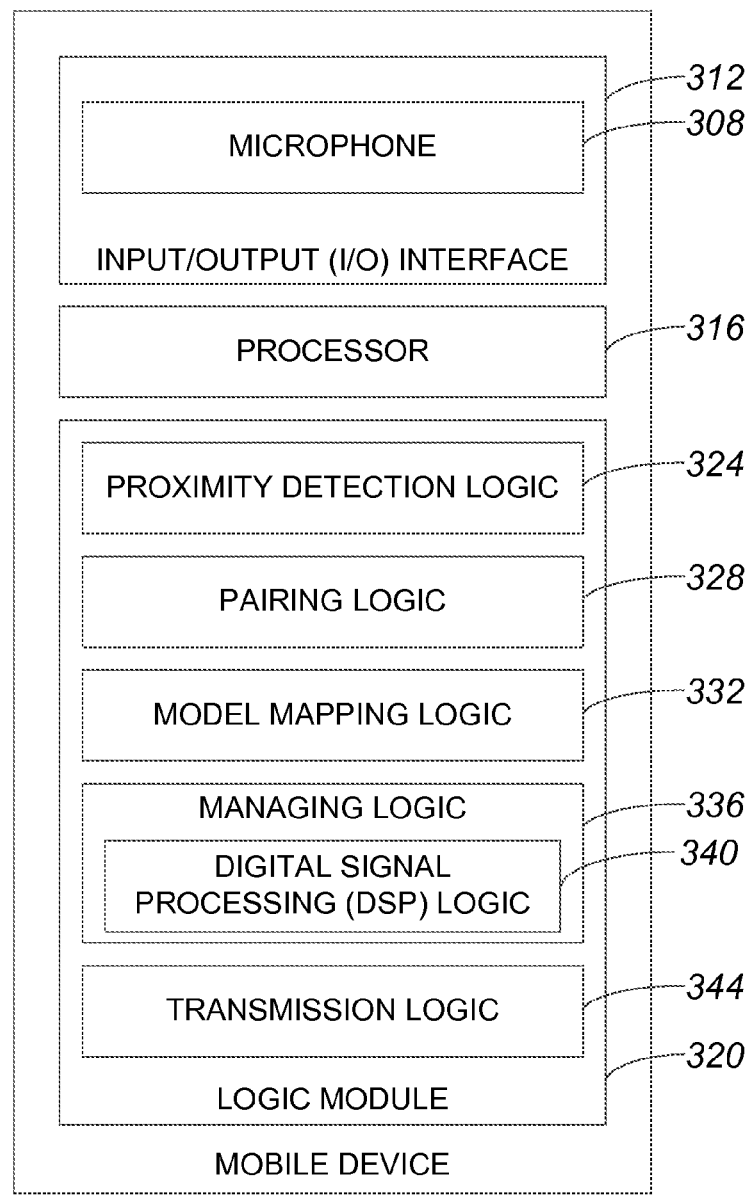
FIG. 3 is a diagrammatic representation of a managing mobile device in accordance with an embodiment

In general, any mobile device which has a microphone included in an ad-hoc microphone array may serve as a managing mobile device. With reference to FIG. 3, one embodiment of a managing mobile device will be described. A managing mobile device 304 includes an input/output (I/O) interface 312, a processor 316, and a logic module 320.

I/O interface 312 generally allows mobile device 304 to communicate on a network, e.g., a wireless or cellular communications network, and includes a microphone 308. It should be appreciated that managing mobile device may include more than one microphone 308.

Logic module 320 generally includes hardware and/or software logic. Processor 316 is configured to execute software logic included in logic module 320. In the described embodiment, logic module includes proximity detection logic 324, pairing logic 328, model mapping logic 332, managing logic 336, and transmission logic 344.

Proximity detection logic 324 is configured to effectively detect or otherwise identify when there is at least one mobile device in proximity to mobile device 304. Proximity detection logic 324 may include, or may have access to, transmitters which may provide notifications which effectively identify mobile devices that are in proximity to the transmitters.

Pairing logic 328 is configured to pair mobile devices that are in proximity to each other. For example, pairing logic 328 may pair mobile device 304 to other mobile devices within its proximity to essentially create an ad-hoc microphone array.

Model mapping logic 332 is configured to map a physical relationship between paired mobile devices. Model mapping logic 332 may obtain information from sensing devices, e.g., transmitters, which identify mobile devices in proximity to the sensing devices. Model mapping logic 332 may also obtain information from mobile devices which derive their relative locations based on the information from sensing devices.

Managing logic 336 is configured to process streams, e.g., audio, obtained from microphone 308 and from other mobile devices such that an aggregate stream may be generated. Managing logic 336 may include digital signal processing logic 340 that is arranged to process obtained streams to enhance the aggregate stream, or to create an enhanced aggregate stream. That is, managing logic 336 is generally arranged to handle the aggregation and processing of audio streams. Processing audio streams may include, but is not limited to including, substantially optimizing an aggregate stream based upon capabilities of a device intended to receive the aggregate stream. Digital processing logic 340 may use location information, e.g., position and orientation information, relating to mobile device 304 and to other mobile devices paired to mobile device when performing digital signal processing to create an enhanced aggregate stream that is arranged to be transmitted, as for example to remote participants in a meeting.

Transmission logic 344 is arranged to transmit an aggregate stream or an outbound stream created by managing logic 336. Transmission logic 344 may cause an aggregate stream such as an enhanced aggregate stream to be transmitted across a network to, or otherwise provided to, remote or virtual participants in a meeting. In one embodiment, the aggregate stream transmitted using transmission logic 344 may include metadata that may be used by a recipient of the aggregate stream to enhance source separation.

Figure 4:
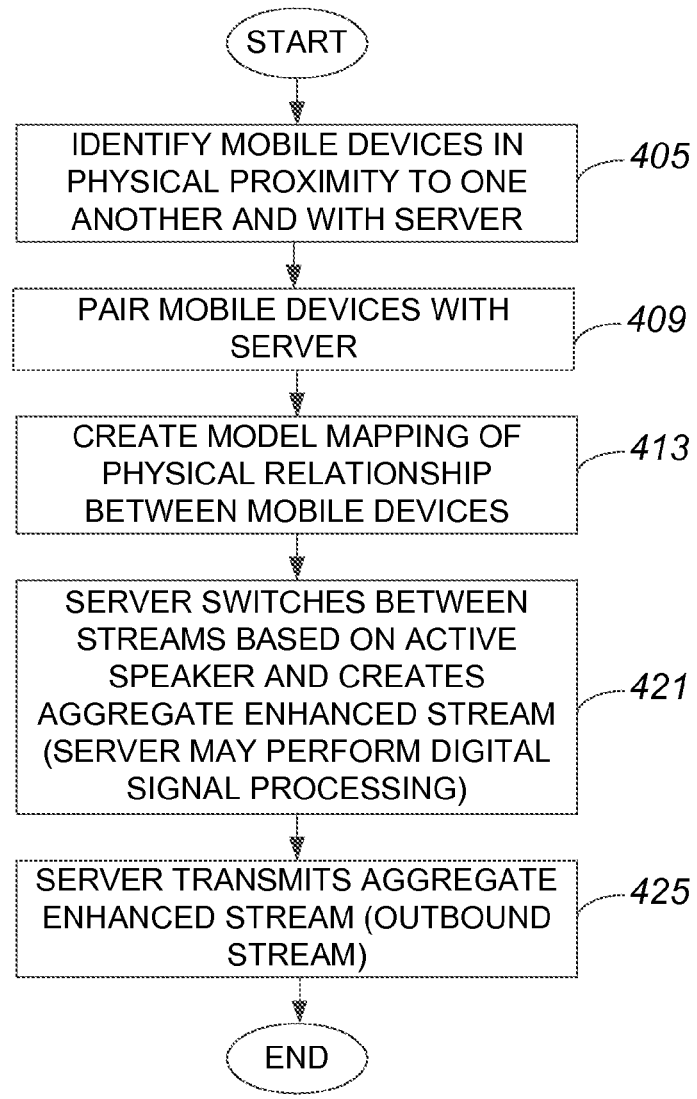
FIG. 4 is a process flow diagram which illustrates a method of creating and utilizing an ad-hoc microphone array that includes a plurality of mobile devices managed by a server in accordance with an embodiment.

In one embodiment, in lieu of a mobile device acting as a managing mobile device for an ad-hoc microphone array, a central device or a managing server may instead provide management functionality for an ad-hoc microphone array. For example, a conference server that is located in a conference room may support an ad-hoc microphone array that includes mobile devices located in the conference room. Alternatively, a server that is located outside a conference room, but is effectively in communication with the conference room, may support an ad-hoc microphone array. FIG. 4 is a process flow diagram which illustrates a method of creating and utilizing an ad-hoc microphone array that includes a plurality of mobile devices managed by a server in accordance with an embodiment. A method 401 of creating and utilizing an ad-hoc microphone array that includes a plurality of mobile devices managed by a server begins at step 405 in which mobile devices in physical proximity to one another, and with a server, are identified. The identification of the mobile devices may be made by the server. In general, the mobile devices may be identified when the server is used to initiate and to maintain a meeting.

Once mobile devices in physical proximity to one another are identified, the mobile devices are paired with the server in step 409. A model mapping of a physical relationship between the mobile devices is then created in step 413. After the model mapping is created, the server may switch between streams provided by the mobile devices to create an aggregate enhanced stream in step 421 based on the identity of an active speaker. For example, the stream provided by a mobile device that is nearest to the active speaker may be a significant component of the aggregate enhanced stream. It should be appreciated that the server may also perform digital signal processing when creating the aggregate enhanced stream.

The server may transmit an aggregate enhanced stream, or an outbound stream, in step 425. Such a stream may be transmitted to remote participants in the meeting. The method of creating and utilizing an ad-hoc microphone array is completed when the server transmits an aggregate enhanced stream.

Figure 5:
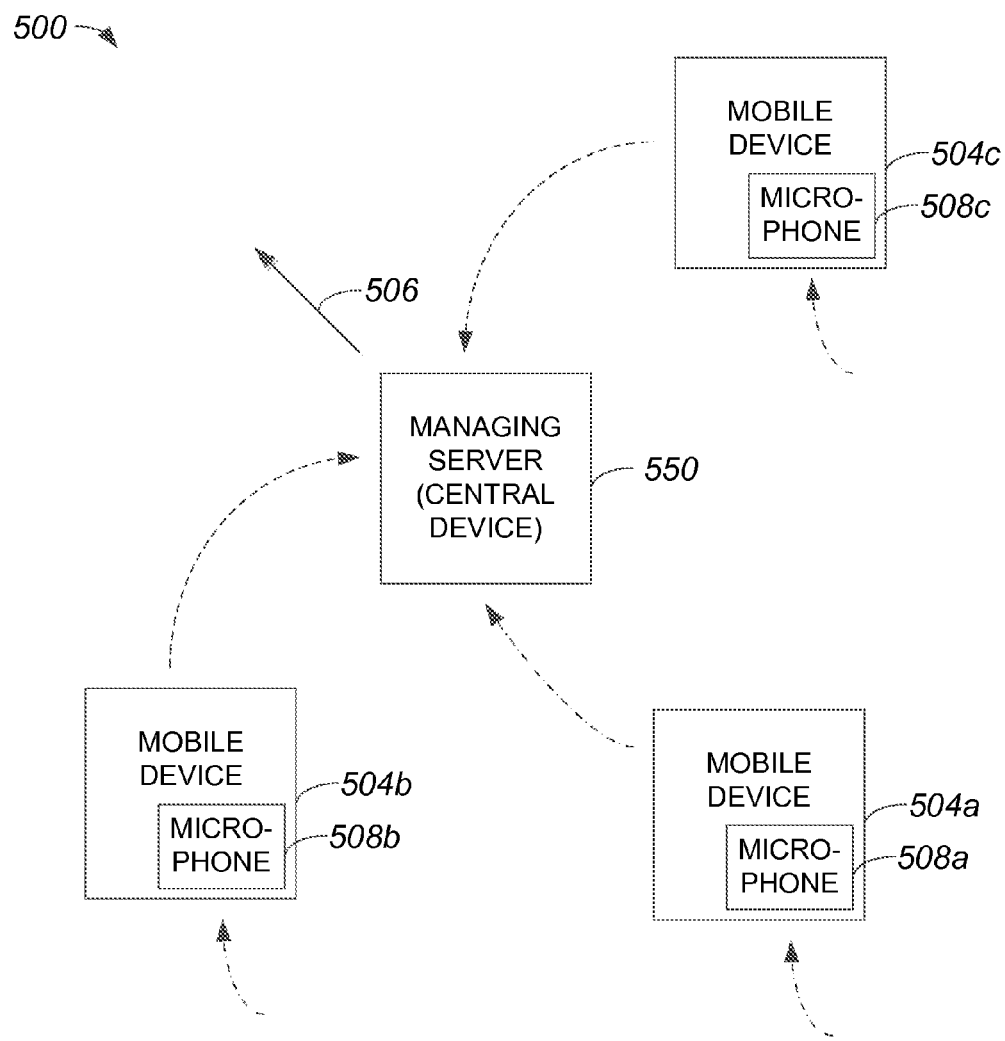
FIG. 5 is a diagrammatic representation of an ad-hoc microphone array that includes a plurality of mobile devices managed by a server in accordance with an embodiment.

FIG. 5 is a diagrammatic representation of an ad-hoc microphone array that includes a plurality of mobile devices managed by a server in accordance with an embodiment. An ad-hoc microphone array 500 may include multiple mobile devices 504*a-c*. Each mobile device 504*a-c* includes a microphone 508*a-c*. Ad-hoc microphone array 500 may be created or otherwise formed when parties in possession of mobile devices 504*a-c* are at substantially the same physical location and are participating in a meeting, e.g., a telepresence meeting, that is managed by a managing server 550.

Managing server 550, or a central device, is arranged to effectively obtain sound captured by microphones 508*a-c* and to create an outbound stream 506, or an aggregate enhanced stream, for transmission to remote or virtual participants in the meeting. Managing server 550 may be located in proximity to mobile devices 504*a-c*, and arranged to detect when mobile devices 504*a-c* are within a particular range of managing server 550, or within a particular range of a sensing device (not shown) that is in communication with managing server 550. Managing server 550 may also perform digital signal processing on the sound captured by microphones 508*a-c* to create the outbound stream. It should be appreciated that managing server 550 may be considered to be part of ad-hoc microphone array 500. In one embodiment, managing server 550 may be located at substantially the same physical location as ad-hoc microphone array 500, although it should be understood that managing server 550 may instead be at a different physical location from ad-hoc microphone array 500 but in communication with ad-hoc microphone array 500.

Figure 6:
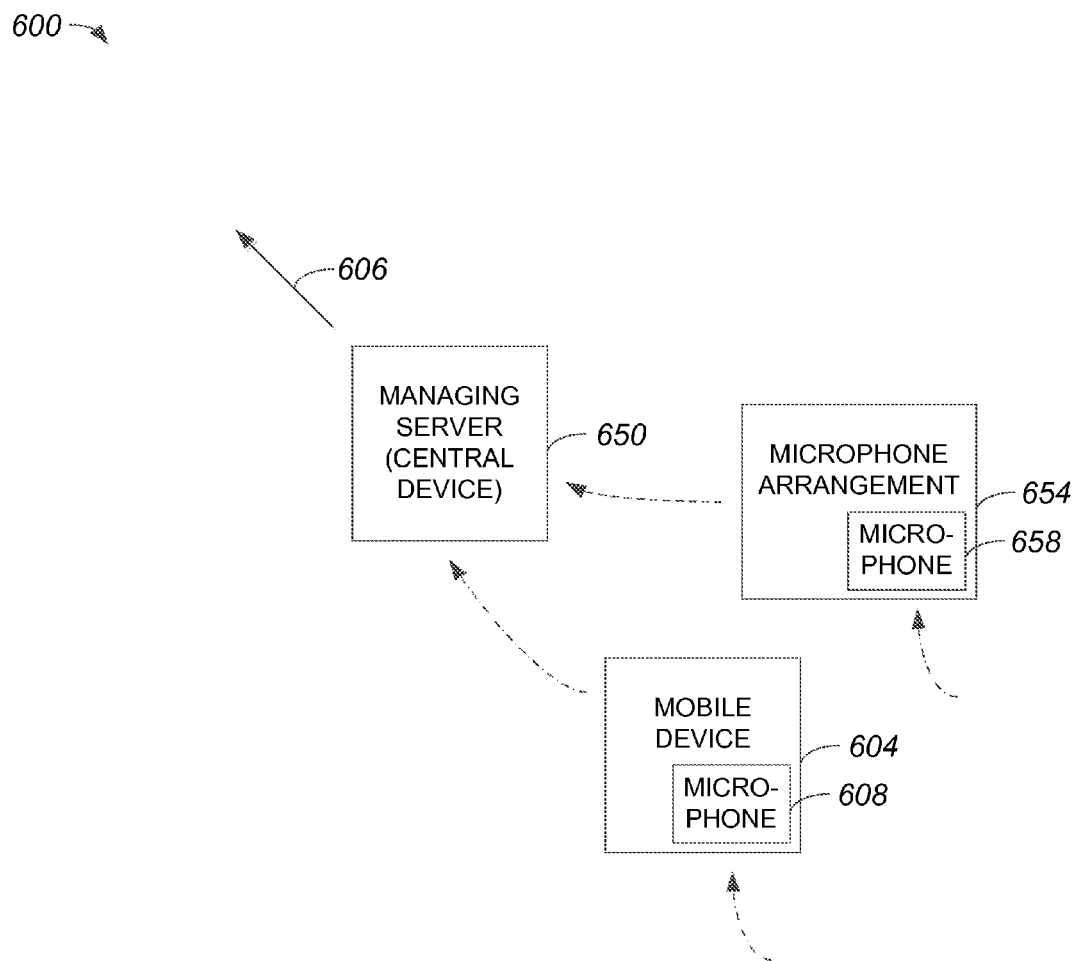
FIG. 6 is a diagrammatic representation of an ad-hoc microphone array that includes at least one mobile device and at least one microphone not included in a mobile device, e.g., a microphone arrangement of a speaker phone or a microphone arrangement of a television, in accordance with an embodiment.

Some ad-hoc microphone arrays may include substantially only microphones of mobile devices. It should be appreciated, however, that other ad-hoc microphone arrays may include both microphones of mobile devices and other microphones, e.g., microphones of a speaker phone and/or standalone acoustic microphones. FIG. 6 is a diagrammatic representation of an ad-hoc microphone array that includes at least one mobile device and at least one microphone not included in a mobile device, e.g., a microphone arrangement of a non-mobile device, in accordance with an embodiment. An ad-hoc microphone array 600 includes a mobile device 604 which includes a microphone 608, and a microphone arrangement 654 which includes a microphone 658.

Microphone arrangement 654 may be any suitable arrangement which includes microphone 658. For example, microphone arrangement 654 may be a standalone acoustic microphone arrangement, a speaker phone, a computing device, and/or any other device which includes microphone 658.

Managing server 650 may detect when mobile device 604 and microphone arrangement 654 are within proximity to each other and/or to managing server 650, and form ad-hoc microphone array 600. Managing server 650 is arranged to obtain streams from mobile device 604 and microphone arrangement 654, and to create an outbound stream 606 that may be transmitted, e.g., to remote participants in a meeting. When managing server 650 creates or generates outbound stream 606, managing server 650 may apply digital signal processing techniques to streams obtained from mobile device and microphone arrangement 654.

Figure 7A:
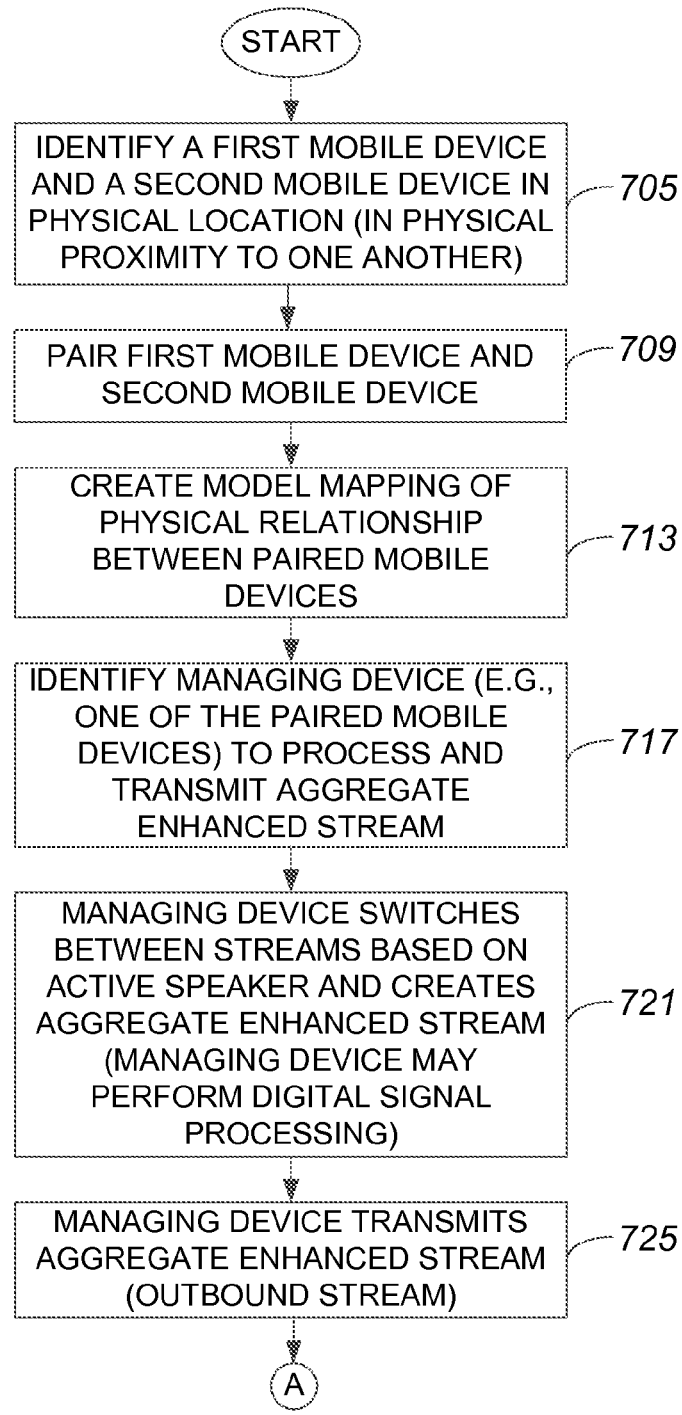
FIGS. 7A and 7B are a process flow diagram which illustrates one method of creating and utilizing an ad-hoc microphone array that includes a plurality of mobile devices which may be added and removed from the ad-hoc microphone array in accordance with an embodiment.
Figure 7B:
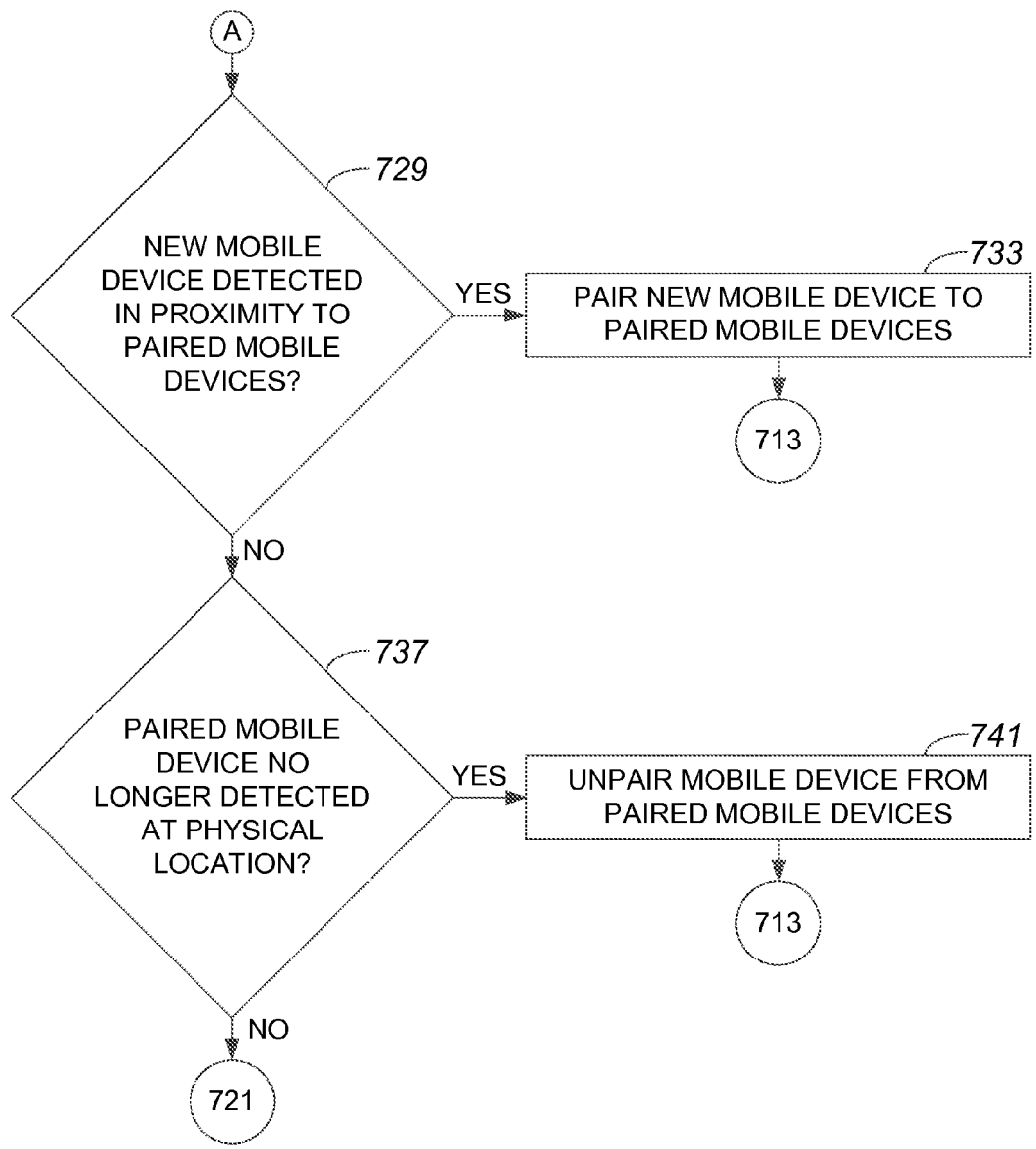

During the course of a meeting in which an ad-hoc microphone array is used to capture sounds, microphones included in the ad-hoc microphone array may change. By way of example, one microphone originally included in an ad-hoc microphone array may be moved away from the physical location of the ad-hoc microphone array, and another microphone may move into the physical proximity of other microphones in the ad-hoc microphone array. With reference to FIGS. 7A and 7B, a method of creating and utilizing an ad-hoc microphone array that includes a plurality of mobile devices which may be added and removed from the ad-hoc microphone array will be described in accordance with an embodiment. A method 701 of creating and utilizing an ad-hoc microphone array begins at step 705 in which a first mobile device and a second mobile device that are in physical proximity to one another at a particular location are identified. The first mobile device and the second mobile device may generally be in the possession of participants in a meeting. Once identified, the first mobile device and the second mobile device are paired in step 709.

In step 713, a model mapping of a physical relationship between the paired mobile devices is created. After the model mapping is created, a managing device is identified in step 717 to process and to transmit an aggregate enhanced stream to virtual participants in the meeting. In one embodiment, the managing device may be one of the paired mobile devices. In another embodiment, the managing device may be a managing server. It should be appreciated that in still another embodiment, managing functionality may be distributed between the paired mobile devices and, as such, the managing device may effectively be the set of paired mobile devices.

The managing device switches between streams obtained from the paired mobile devices based on an active speaker, and creates an aggregate enhanced stream in step 721. The managing device may also perform digital signal processing when creating an aggregate enhanced stream for transmission to the virtual participants in the meeting. Once the aggregate enhanced stream, or the outbound stream, is created, the managing device transmits the aggregate enhanced stream in step 725.

A determination is made in step 729 as to whether a new mobile device is detected in proximity to the paired mobile devices. If the determination is that a new mobile device is detected in proximity to the paired mobile devices, the new mobile device is paired to the other mobile devices, e.g., the first mobile device and the second mobile devices, in step 733. From step 733, process flow moves to step 713 in which a model mapping of the physical relationship between paired mobile devices is created.

Returning to step 729, if the determination is that no new mobile device has been detected in proximity to the paired mobile devices, it is determined in step 737 whether a paired mobile device is no longer detected at the physical location. That is, a determination is made in step 737 as to whether all of the paired mobile devices are still detected at the physical location. If it is determined that a paired mobile device is no longer detected at the physical location, the mobile device that is no longer detected at the physical location is unpaired from the other paired mobile devices in step 741. From step 741, process flow moves to step 713 in which a model mapping of the physical relationship between paired mobile devices is created.

Alternatively, if it is determined in step 737 that all paired mobile devices is are still detected at the physical location, then process flow returns to step 721 in which the managing device continues to switch between streams based on an active speaker, and creates an aggregate enhanced stream. That is, if all paired mobile devices are still detected at the physical location, then the managing device continues to switch between streams and creates an aggregate enhanced stream.

In one embodiment, paired mobile devices may move relative to one another, while still being detected at a physical location. That is, the positioning and orientation of paired mobile devices at a physical location may change. It should be appreciated that when paired mobile devices move relative to one another at a physical location, a new model mapping of a physical relationship between the paired mobile devices may be created. When a change is detected in a location and/or an orientation of a paired mobile device at a physical location, a new model mapping may be created to further enhance the performance of an ad-hoc microphone array formed from paired mobile devices.

Figure 8:
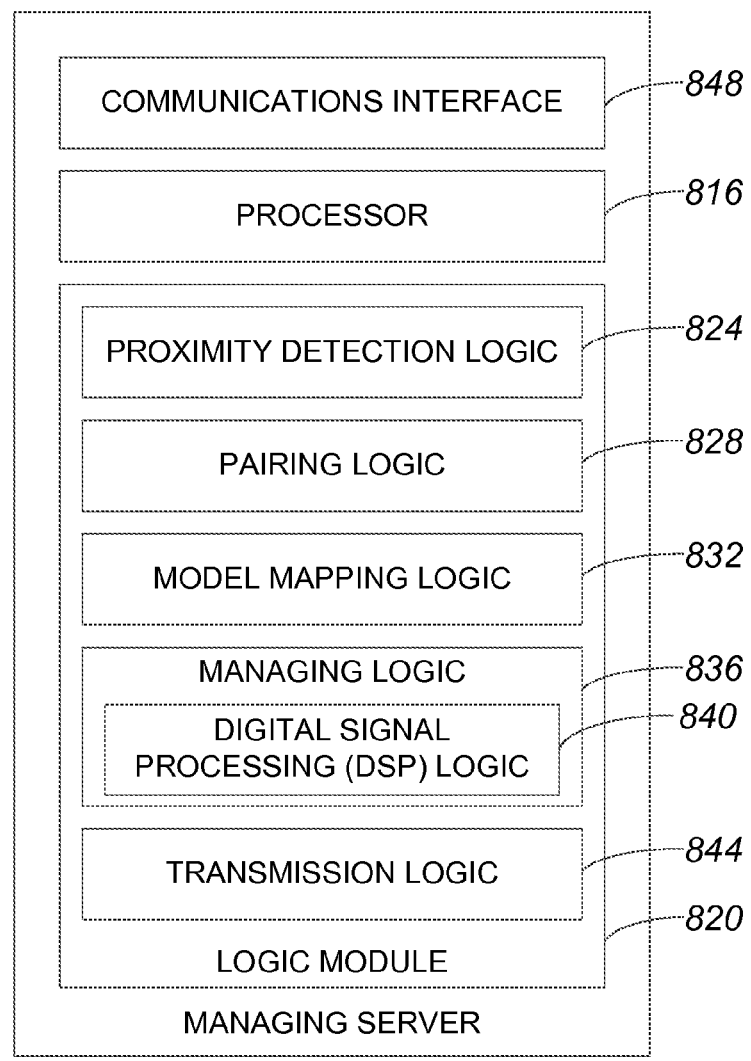
FIG. 8 is a diagrammatic representation of a managing server in accordance with an embodiment.

One embodiment of a managing server will be described with respect to FIG. 8. FIG. 8 is a diagrammatic representation of a managing server. A managing server 850 includes a communications interface 848, a processor 816, and a logic module 820. It should be appreciated that managing server 850 may be physically located at substantially the same physical location as an ad-hoc microphone array that managing server 850 is managing, or managing server 850 may be located at a different location and in communication with an ad-hoc microphone array that managing server 850 is managing.

Communications interface 848 generally allows managing server 850 to communicate on a network, e.g., a wireless or cellular communications network. Communications interface 848 may be configured to allow managing server 850 to communicate with microphones of an ad-hoc microphone array during a meeting, and to communicate with remote participants in the meeting.

Logic module 820 generally includes hardware and/or software logic. Processor 816 is configured to execute software logic included in logic module 820. In the described embodiment, logic module includes proximity detection logic 824, pairing logic 828, model mapping logic 832, managing logic 836, and transmission logic 844.

Proximity detection logic 824 is configured to effectively detect or otherwise identify when there are devices with microphones, e.g., mobile devices with microphones, in proximity to each other. In one embodiment proximity detection logic 824 may determine when mobile devices are in proximity to each other and to managing server 850. Proximity detection logic 824 may include, or may have access to, transmitters which may provide notifications which effectively identify mobile devices that are in proximity to the transmitters.

Pairing logic 828 is configured to pair mobile devices that are in proximity to each other. That is, pairing logic 828 is arranged to pair mobile devices that are in proximity to each other and, in some instances, in proximity to managing server 850 such that an ad-hoc microphone array is created.

Model mapping logic 832 is configured to map a physical relationship between paired mobile devices. Model mapping logic 832 may obtain information from sensing devices, e.g., transmitters, which identify mobile devices in proximity to the sensing devices. Model mapping logic 832 may also obtain information from mobile devices which derive their relative locations based on the information from sensing devices. Such information may be used to map a physical relationship between paired mobile devices.

Managing logic 836 is configured to process streams, e.g., audio, obtained by managing server 850 from an ad-hoc microphone array that includes paired mobile devices to produce an aggregate stream. Managing logic 836 may include digital signal processing logic 340 that is arranged to process streams obtained from microphones in an ad-hoc microphone array to enhance the aggregate stream, or to create an enhanced aggregate stream. That is, managing logic 836 is generally arranged to handle the aggregation and processing of audio streams. Processing audio streams may include, but is not limited to including, substantially optimizing an aggregate stream based upon capabilities of a device intended to receive the aggregate stream. Digital processing logic 840 may use location information, e.g., position and orientation information, relating to mobile devices when performing digital signal processing to create an enhanced aggregate stream that is arranged to be transmitted, as for example to remote participants in a meeting.

Transmission logic 844 is arranged to transmit an aggregate stream or an outbound stream created by managing logic 836. Transmission logic 844 may cause an aggregate stream such as an enhanced aggregate stream to be transmitted across a network to, or otherwise provided to, remote or virtual participants in a meeting. In one embodiment, the aggregate stream transmitted using transmission logic 844 may include metadata that may be used by a recipient of the aggregate stream to enhance source separation.

Although only a few embodiments have been described in this disclosure, it should be understood that the disclosure may be embodied in many other specific forms without departing from the spirit or the scope of the present disclosure. By way of example, any suitable apparatus or method may be used to determine when two or more mobile devices are in physical proximity to one another. Further, thresholds used to determine when mobile device is in physical proximity to another mobile device may vary widely.

Mobile devices may be configured to automatically join an ad-hoc microphone array. Alternatively, a mobile device may be added into an ad-hoc microphone array substantially manually, e.g., by accessing an application that is used to allow the mobile device to join the ad-hoc microphone array. In other words, a mobile device with a microphone may join an ad-hoc microphone array either implicitly or explicitly. In one embodiment, a mobile device known to be associated with a particular meeting attendee may be allowed to automatically join an ad-hoc microphone array during a meeting, while a mobile device that is not known to be associated with a particular meeting attendee may be required to undergo an authorization process before being allowed to join the ad-hoc microphone array.

A determination of which mobile device of an ad-hoc microphone array is to be used as a master device, or to process and to transmit an aggregate stream, may be based on a number of different factors. Factors used to identify a suitable mobile device for use as a managing device with respect to an ad-hoc microphone array may include, but are not limited to including, the capabilities of a mobile device and the resources available to the mobile device. For instance, a mobile device may be identified for use as a managing device based upon available processing, available memory, available network capabilities, available battery life, and/or power consumption considerations. In one embodiment, if multiple mobile devices are capable of serving as a managing device, the mobile device may effectively share the role of a managing device such that power consumption burdens may be substantially shared.

As mentioned above, digital signal processing may be used to generate an enhanced aggregate stream, or enhanced outbound stream. Information such as a physical location of a microphone of a mobile device and an orientation of the microphone may generally be used to improve digital signal processing. When positional information provided with respect to a microphone of a mobile device is considered to be relatively inaccurate, accurate positional and orientation information may be provided for purposes of digital signal processing using other methods. By way of example, an ultrasonic ping may be used to provide accurate positioning and orientation information about a mobile device. Such an ultrasonic ping may also provide valuable metadata in real-time, and may reduce timing issues and out-of-band communications issues.

When mobile devices are within physical proximity to each other, the mobile devices may be located at certain distances from each other. For example, a first mobile device may be considered to be in physical proximity to a second mobile device if the first mobile device and the second mobile device are separated by less than a predetermined distance. Mobile devices may also be in physical proximity to each other if the mobile devices are all at a particular physical location, e.g., in a room or within a predefined set of boundaries.

Meetings at which an ad-hoc microphone array is defined and used may vary widely. Meetings may generally include any meetings in which microphones are used, e.g., meetings that include remote or virtual attendees. Such meetings may include, but are not limited to including, multimedia meetings such as telepresence meetings, video meetings, and audio meetings.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. A tangible medium may be substantially any computer-readable medium that is capable of storing logic or computer program code which may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples is not to be limited to the details given herein, but may be modified within the scope of the appended claims.

What is claimed is:

1. A method comprising:
   determining when a first device and a second device are in proximity to each other, wherein the first device includes a first microphone and the second device includes a second microphone;
   pairing the first device and the second device, wherein pairing the first device and the second device forms a microphone array, the microphone array including the first microphone and the second microphone, wherein the first device and the second device are paired during a meeting, the first device and the second device being located at a physical location associated with the meeting;
   creating a model mapping of a physical relationship between the first device and the second device;
   creating an aggregate stream using a first stream obtained from the first microphone and a second stream obtained from the second microphone, wherein creating the aggregate stream includes using the model mapping to determine when to use the first stream and when to use the second stream; and
   transmitting the aggregate stream, wherein transmitting the aggregate stream includes transmitting the aggregate stream to at least one virtual participant in the meeting.

2. The method of claim 1 wherein creating the aggregate stream includes processing at least one of the first stream and the second stream using digital signal processing.

3. The method of claim 1 wherein the first device is a first mobile device and the second device is a second mobile device, the method further including:
   identifying the first mobile device as a managing device, wherein the first mobile device creates the aggregate stream.

4. The method of claim 3 wherein the first mobile device transmits the aggregate stream.

5. The method of claim 1 wherein the first device is a first mobile device and the second device is a second mobile device, and wherein a managing server creates the aggregate stream and transmits the aggregate stream.

6. A tangible, non-transitory computer-readable medium comprising computer program code, the computer program code, when executed, configured to:
   determine when a first device and a second device are in proximity to each other, wherein the first device includes a first microphone and the second device includes a second microphone, wherein the first device and the second device are paired during a meeting, the first device and the second device being located at a physical location associated with the meeting;
   pair the first device and the second device, wherein the computer program code configured to pair the first device and the second device is configured to form a microphone array, the microphone array including the first microphone and the second microphone;
   create a model mapping of a physical relationship between the first device and the second device;
   create an aggregate stream using a first stream obtained from the first microphone and a second stream obtained from the second microphone, wherein the computer program code configured to create the aggregate stream is configured to use the model mapping to determine when to use the first stream and when to use the second stream; and
   transmit the aggregate stream, wherein the computer program code configured to transmit the aggregate stream is configured to transmit the aggregate stream to at least one virtual participant in the meeting.

7. The tangible, non-transitory computer-readable medium comprising computer program code of claim 6 wherein the computer program code configured to create the aggregate stream is configured to process at least one of the first stream and the second stream using digital signal processing.

8. The tangible, non-transitory computer-readable medium comprising computer program code of claim 6 wherein the first device is a first mobile device and the second device is a second mobile device, the computer program code further configured to:
   identify the first mobile device as a managing device, wherein the first mobile device creates the aggregate stream.

9. The tangible, non-transitory computer-readable medium comprising computer program code of claim 8 wherein the aggregate stream is transmitted by the first mobile device.

10. The tangible, non-transitory computer-readable medium comprising computer program code of claim 6 wherein the first device is a first mobile device and the second device is a second mobile device, and the aggregate stream is created by a managing server and the aggregate stream is transmitted by the managing server.

11. An apparatus comprising:
    a processor; and
       logic configured to be executed by the processor, the logic including proximity detection logic, pairing logic, managing logic, and transmission logic, the proximity detection logic being configured to determine when a first device is in proximity to the apparatus at a first physical location, the first device being a first mobile device and including a first microphone, the pairing logic being configured to pair the first microphone and a second microphone to form a microphone array, the pairing logic further being arranged to pair the first microphone and the second microphone during a meeting, the transmission logic being arranged to transmit the aggregate stream to a remote participant in the meeting, wherein the managing logic is configured to create an aggregate stream using a first stream obtained from the first microphone and a second stream obtained from the second microphone, and wherein the logic further includes model mapping logic, the model mapping logic being configured to create a model mapping of a physical relationship between the first mobile device and the apparatus, the managing logic further being configured to use the model mapping to determine when to use the first stream and when to use the second stream.

12. The apparatus of claim 11 wherein the apparatus is a second mobile device, and wherein the pairing logic is configured to pair the first microphone and the second microphone by pairing the first mobile device and the second mobile device, the apparatus further including:

the second microphone.

13. The apparatus of claim 11 wherein the managing logic is configured to create the aggregate stream by applying digital signal processing to at least one of the first stream and the second stream.

14. The apparatus of claim 11 wherein the second microphone is included in a second device and the apparatus is a managing server, and wherein the pairing logic is configured to pair the first microphone and the second microphone by pairing the first mobile device and the second device.

* * * * *